US007864691B2

(12) United States Patent
Deragon et al.

(10) Patent No.: US 7,864,691 B2
(45) Date of Patent: Jan. 4, 2011

(54) APPARATUS AND METHOD FOR PERFORMING A LOOPBACK TEST IN A COMMUNICATION SYSTEM

(75) Inventors: Aaron Thomas Deragon, Poland, NY (US); Gregory J. Soule, Utica, NY (US)

(73) Assignee: Anritsu Instruments Company, Utica, NY (US)

( * ) Notice: Subject to any disclaimer, the term of this patent is extended or adjusted under 35 U.S.C. 154(b) by 90 days.

(21) Appl. No.: 12/139,916

(22) Filed: Jun. 16, 2008

(65) Prior Publication Data

US 2008/0304420 A1    Dec. 11, 2008

Related U.S. Application Data

(63) Continuation of application No. 10/931,483, filed on Sep. 1, 2004, now Pat. No. 7,408,883.

(51) Int. Cl.
*H04L 1/14* (2006.01)
(52) U.S. Cl. ..................................... 370/249
(58) Field of Classification Search ... 370/236.1–236.2, 370/249–251
See application file for complete search history.

(56) References Cited

U.S. PATENT DOCUMENTS

| | | | |
|---|---|---|---|
| 5,173,896 A | 12/1992 | Dariano | |
| 5,305,078 A | 4/1994 | Lamonde et al. | |
| 5,367,520 A | 11/1994 | Cordell | |
| 5,455,672 A | 10/1995 | Lamonde et al. | |
| 5,506,847 A | 4/1996 | Shobatake et al. | |
| 5,553,059 A | 9/1996 | Emerson et al. | |
| 5,659,540 A | 8/1997 | Chen et al. | |
| 5,710,760 A | 1/1998 | Moll | |
| 5,940,375 A | 8/1999 | Soumiya et al. | |
| 5,970,069 A | 10/1999 | Kumar et al. | |
| 5,974,046 A | 10/1999 | Kim et al. | |
| 6,032,187 A | 2/2000 | Blain | |
| 6,269,082 B1 | 7/2001 | Mawhinney et al. | |

(Continued)

FOREIGN PATENT DOCUMENTS

CA    2310887 A1    12/2001

(Continued)

OTHER PUBLICATIONS

S. Bradner, Harvard University and J. McQuaid NetScout Systems, "Benchmarking Methodology for Network Interconnect Devices", 29 pages, Mar. 1999.

(Continued)

*Primary Examiner*—Thai D Hoang
(74) *Attorney, Agent, or Firm*—Marjama, Muldoon, Blasiak & Sullivan LLP

(57) ABSTRACT

The invention is test apparatus and methods for performing loopback tests. The tests involve generating a packet-based test message having a source address and a destination address. When the test message arrives at the destination, the addresses are exchanged and the message is returned to the source. The addresses can be level 2 addresses, such as MAC addresses, and/or level 3 addresses, such as IP addresses. The returned message and the propagation properties observed for the test message can be used to determine information about the network being tested.

32 Claims, 9 Drawing Sheets

U.S. PATENT DOCUMENTS

| | | | |
|---|---|---|---|
| 6,404,740 B1 | 6/2002 | Yoshida et al. | |
| 6,434,118 B1 | 8/2002 | Kirschenbaum et al. | |
| 6,442,175 B1 | 8/2002 | Shibuya et al. | |
| 6,466,548 B1 | 10/2002 | Fitzgerald | |
| 6,480,888 B1 | 11/2002 | Pedersen | |
| 6,873,599 B1 | 3/2005 | Han | |
| 7,085,238 B2 * | 8/2006 | McBeath | 709/251 |
| 7,304,956 B2 | 12/2007 | Lloyd et al. | |
| 7,519,004 B1 * | 4/2009 | Kamity et al. | 370/248 |
| 2003/0115368 A1 | 6/2003 | Wu | |
| 2003/0223376 A1 * | 12/2003 | Elliott et al. | 370/249 |
| 2004/0208129 A1 * | 10/2004 | Old et al. | 370/241 |
| 2005/0099951 A1 * | 5/2005 | Mohan et al. | 370/241 |
| 2005/0135259 A1 * | 6/2005 | Yazdi et al. | 370/241 |
| 2005/0220014 A1 | 10/2005 | DelRegno et al. | |
| 2005/0220022 A1 | 10/2005 | DelRegno et al. | |
| 2005/0220033 A1 | 10/2005 | DelRegno et al. | |
| 2005/0220059 A1 | 10/2005 | DelRegno et al. | |
| 2005/0220107 A1 | 10/2005 | DelRegno et al. | |
| 2005/0220143 A1 | 10/2005 | DelRegno et al. | |
| 2005/0220148 A1 | 10/2005 | DelRegno et al. | |
| 2005/0226215 A1 | 10/2005 | DelRegno et al. | |
| 2005/0238049 A1 | 10/2005 | Delregno | |
| 2005/0251858 A1 | 11/2005 | DelRegno et al. | |
| 2005/0259589 A1 * | 11/2005 | Rozmovits et al. | 370/249 |
| 2005/0270982 A1 | 12/2005 | McBeath | |
| 2005/0281392 A1 * | 12/2005 | Weeks et al. | 379/22 |
| 2006/0143548 A1 | 6/2006 | DelRegno et al. | |
| 2006/0153070 A1 | 7/2006 | DelRegno et al. | |

FOREIGN PATENT DOCUMENTS

| | | |
|---|---|---|
| JP | 2003304264 A | 10/2003 |
| WO | WO-0195561 A2 | 12/2001 |
| WO | WO-2007040482 A1 | 4/2007 |

OTHER PUBLICATIONS

Yuri Breibart, Minos Garofalakis, Cliff Martin, Rajeev Rastogi, S. Seshadri, Avi Silberschatz, "Topology Discovery in Heterogeneous IP Networks", Information Sciences Research Center, Bell Labs, Lucent Technologies, 600 Mountain Avenue, Murray Hill, NJ 07974, pp. 265-274 (10 pages) (c) 2000.

Kamil Sarac, Kevin Almeroth, Mping: "A Ping Utility for IP Multicast" 8 pages © 2003.

* cited by examiner

FIG. 3A
Prior Art

| PREAMBLE | DESTINATION ADDRESS | SOURCE ADDRESS | CONTROL FIELD | DATA | PAD | FRAME CHECK SEQUENCE | END FRAME DELIMITER |

FIG. 3B
Prior Art

| PREAMBLE (7 - BYTES) | START FRAME DELIMITER (1 - BYTE) | DEST. MAC ADDRESS (6 - BYTES) | SOURCE MAC ADDRESS (6 - BYTES) | LENGTH / TYPE (2 - BYTES) | MAC CLIENT DATA (0 - n BYTES) | PAD (0 - p BYTES) | FRAME CHECK SEQUENCE (4 - BYTES) |

FIG. 3C
Prior Art

| PREAMBLE (7 - BYTES) | START FRAME DELIMITER (1 - BYTE) | DEST. MAC ADDRESS (6 - BYTES) | SOURCE MAC ADDRESS (6 - BYTES) | LENGTH / TYPE = 802.1Q TAG TYPE (2 - BYTE) | TAG CONTROL INFORMATION (2 - BYTES) | LENGTH / TYPE (2 - BYTES) | MAC CLIENT DATA (0 - n BYTES) | PAD (0 - p BYTES) | FRAME CHECK SEQUENCE (4 - BYTES) |

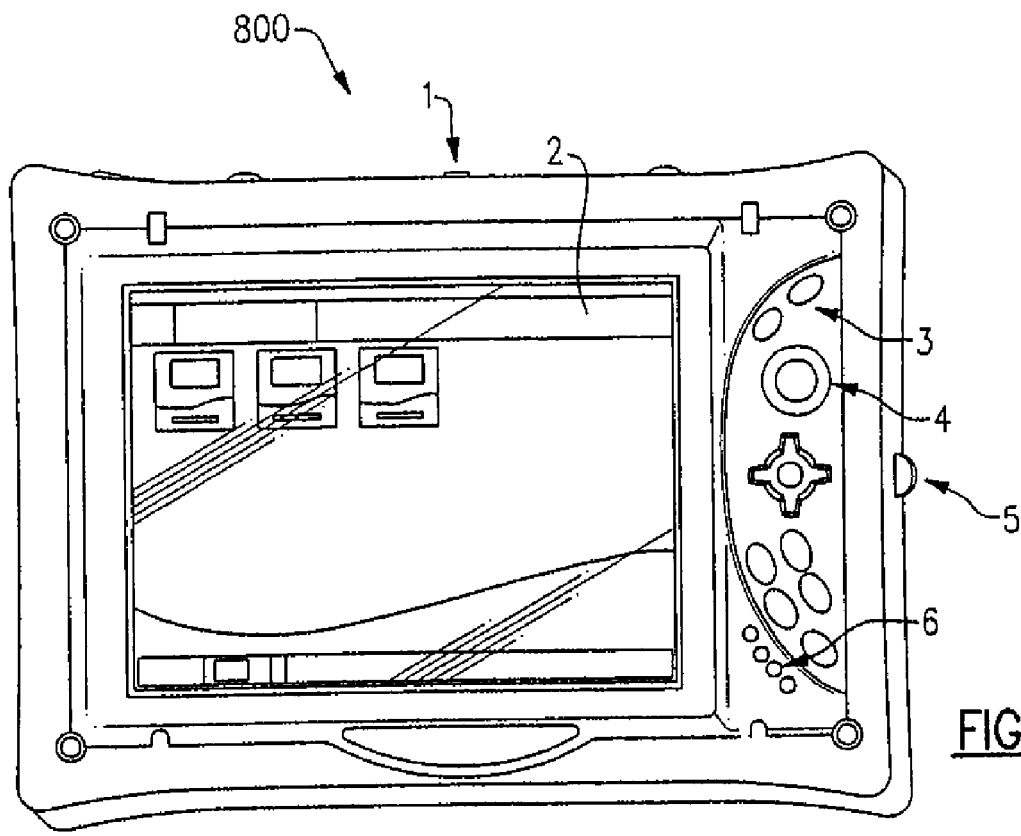
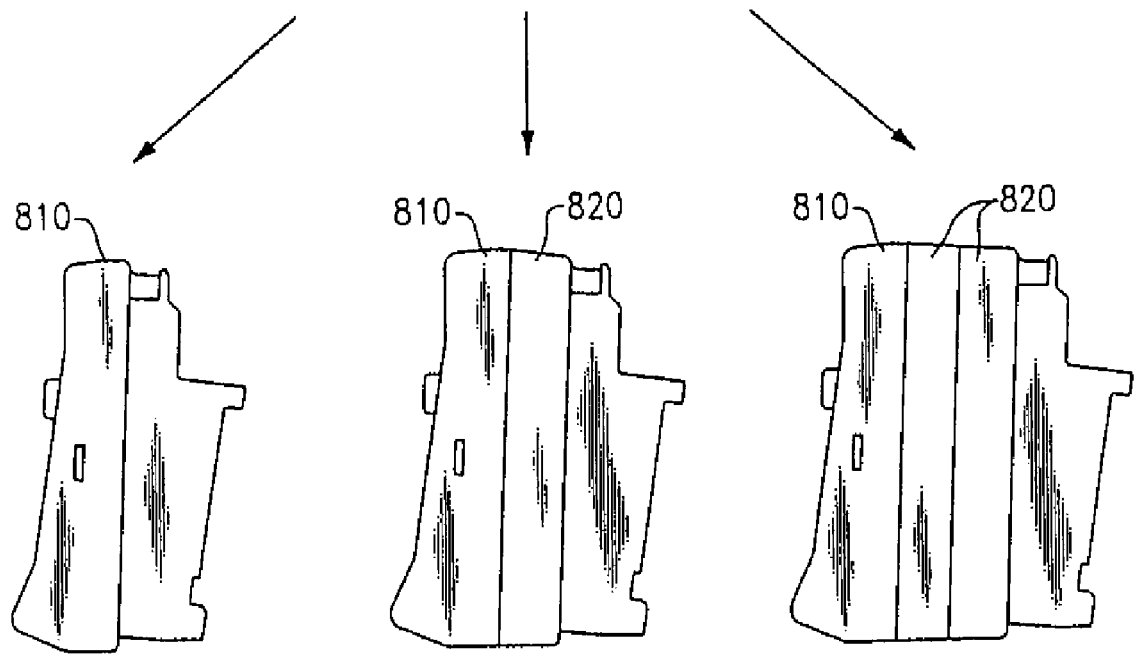
FIG.8
FIG.8A  FIG.8B  FIG.8C

APPARATUS AND METHOD FOR PERFORMING A LOOPBACK TEST IN A COMMUNICATION SYSTEM

CROSS REFERENCE TO RELATED APPLICATIONS

This application is a continuation of U.S. patent application Ser. No. 10/931,483 filed Sep. 1, 2004, (U.S. Patent Application Publication No. 2006/0045021 A1) entitled, "Apparatus and Method For Performing a Loopback Test in a Communication System" which is incorporated herein by reference in its entirety.

FIELD OF THE INVENTION

The invention relates to testing in communication systems in general and particularly to a communication system that employs packets having addresses for performing loopback testing.

BACKGROUND OF THE INVENTION

Loopback testing is a well known technique for examining the operational characteristics of communication systems. In a loopback test, a message is transmitted from a source and traverses some portion of a communication system, ultimately returning to the source. Upon the return of the message, the information content of the message and/or the physical attributes of the message (e.g., signal strength, signal-to-noise ratio, and other parameters of interest) can be observed and compared to the same information and/or parameters as they existed when the message was initially transmitted. Information about the state of the portions of the communication system that the message traversed and indications of the quality of service that is being provided can be extracted from comparing the original message and the message upon its return.

In some communication systems, setting up a loopback test requires either or both special equipment and a disruption of the normal service provided by the communication system. In some instances, for example in certain packet-based communication systems, loopback testing can involve rather sophisticated handling of the test message. In some communication systems, loopback testing can be disrupted by the normal operation of the communication system itself.

In Ethernet networks it is common to have control protocols such as Spanning Tree. Spanning Tree includes a mechanism to detect network loops. If a loop is detected, the network monitoring software (NMS) will disable the ports on which the loop was detected, as loops waste valuable bandwidth. This means that if an apparatus, such as a test instrument, is connected that reflects frames back to the transmitter, in all likelihood, the port on which the reflector is connected will be disabled. Other protocols exist that also detect loops.

There is a need for loopback testing apparatus and methods that operate in a convenient and user-friendly manner and that can perform the desired tests without disruption by the protocols of the communication system.

SUMMARY OF THE INVENTION

In one aspect, the invention relates to an apparatus for loopback testing of digital communication systems. The apparatus comprises a digital transceiver configured to receive at least a first packet of a digital communication from a source and to transmit at least one packet in response to the receipt of the first packet to a destination, each of the packets having a structure including at least one source address portion and at least one destination address portion; and a loopback test module in communication with the digital transceiver, the loopback test module configured to modify the first packet of the digital communication by the exchange of a selected one of the at least one source address portion thereof with a selected one of the at least one destination address portion thereof, thereby generating a second packet. The second packet is configured to be transmitted by the digital transceiver to the source from which the first packet was received, thereby to conduct a loopback test.

In one embodiment, the at least one source address portion and at least one destination address portion are level 2 addresses. In one embodiment, the level 2 addresses are MAC addresses. In one embodiment, each of the packets further have a structure including at least one level 3 source address portion and at least one level 3 destination address portion; and the loopback test module is further configured to modify the first packet of the digital communication by the exchange of a selected one of the at least one level 3 source address portion thereof with a selected one of the at least one level 3 destination address portion thereof, thereby generating a second packet. In one embodiment, the at least one source address portion and at least one destination address portion are level 3 addresses. In one embodiment, the level 3 addresses are IP addresses. In one embodiment, the apparatus for loopback testing of digital communication systems further comprises a loopback test override module in communication with at least one of the digital transceiver and the loopback test module, the loopback test override module configured to recognize the presence of a Virtual Local Area Network (VLAN) tag in the first packet, whereby, optionally, when the loopback test override module fails to recognize the presence of a VLAN tag in the first packet, the second packet is configured to be transmitted by the digital transceiver to the source from which the first packet was received, thereby to conduct a loopback test. In one embodiment, a user of the apparatus can elect to identify at least one of the at least one source address portion and at least one destination address portion; and when the address portion that is identified by the user is present in the first packet, the loopback test module is configured to modify the first packet of the digital communication by the exchange of a selected one of the at least one source address portion thereof with a selected one of the at least one destination address portion thereof, thereby generating a second packet. In one embodiment, the loopback tester apparatus further comprises a portable housing configured to be held in a hand of a user, the housing containing therein the digital transceiver and the loopback test module.

In another aspect, the invention features a method of performing a loopback test on a digital communication system. The method comprises the steps of receiving at a digital transceiver at least a first packet of a digital communication from a source, the packet having a structure including at least one source address portion and at least one destination address portion; generating a second packet from the first packet by exchanging a selected one of the at least one source address portion of the first packet with a selected one of the at least one destination address portion of the first packet; and transmitting the second packet from the digital transceiver to the source from which the first packet was received. The loopback test is thereby carried out.

In one embodiment, the at least one source address portion and at least one destination address portion are level 2 addresses. In one embodiment, the level 2 addresses are MAC addresses. In one embodiment, the at least a first source address portion and at least a first destination address portion are level 2 addresses, and the packet further at least a second source address portion and at least a second destination address portion, wherein the at least a second source address portion and at least a second destination address portion are level 3 addresses. In one embodiment, the at least one source address portion and at least one destination address portion are level 3 addresses. In one embodiment, the level 3 addresses are IP addresses. In one embodiment, the at least one source address portion and at least one destination address portion are level 3 addresses; and the method includes the additional steps of checking for the presence of a Virtual Local Area Network (VLAN) tag in the first packet; and optionally, when, the presence of a VLAN tag in the first packet is not recognized: generating a second packet from the first packet by exchanging a selected one of the at least one source address portion of the first packet with a selected one of the at least one destination address portion of the first packet; and transmitting the second packet from the digital transceiver to the source from which the first packet was received. Thus a loopback test is conducted optionally, when, the presence of a VLAN tag is not recognized. In one embodiment, the method of performing a loopback test on a digital communication system comprises the additional steps of receiving from a user an identification of a selected one of the at least one source address portion and at least one destination address portion; and when the address portion identified by the user is present in the first packet: generating a second packet from the first packet by exchanging a selected one of the at least one source address portion of the first packet with a selected one of the at least one destination address portion of the first packet; and transmitting the second packet from the digital transceiver to the source from which the first packet was received. Thus a loopback test is conducted when the address portion identified by the user is present in the first packet.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3A is a schematic diagram of a generic frame or packet of bits;

FIG. 3B is a diagram showing in schematic form a packet suitable for use in a network that uses Media Access Control (MAC) addressing;

FIG. 3C is a schematic diagram that illustrates the format of an Ethernet frame comprising a VLAN tag;

FIG. 8 is an illustration of an exemplary loopback testing apparatus in front elevation, according to principles of the invention;

FIGS. 8A-8C are illustrations of three embodiments of the loopback testing apparatus of FIG. 8 in side elevation, according to principles of the invention;

DETAILED DESCRIPTION OF THE INVENTION

Figure 1:
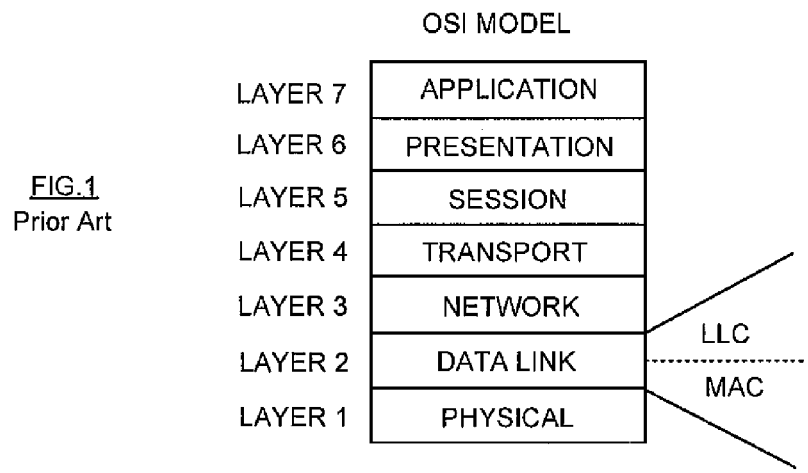
FIG. 1 illustrates a prior art seven layer model that is conventionally used for describing the functions and interrelationships of some digital communication systems.

Loopback testing is performed to determine the performance characteristics between two points in a network, and to determine the state of the network. For example, the loopback test can provide information about such parameters as latency (or the time required for a round trip communication), the accuracy of communication (e.g., whether the message is transmitted without errors, or how many errors on average occur), and parameters relating to the quality of service of the communications links involved in the loop, such as throughput, frame loss, number of transmitted frames, and errors in data during transmission. In general, a loopback test is performed by sending a signal from a source node (e.g., a selected location or piece of equipment which will be designated "A") over the network to a destination node (e.g., a selected location or piece of equipment which will be designated "B"), and then returning the signal from the "B" node to the "A" node. For systems having a plurality of possible nodes as destinations, designated B1, B2, . . . Bn, where n is an integer greater than 1, there are three possible kinds of communications that can be considered. A unicast is a transmission of a signal from the node A to only one designated node of the destinations B1, B2, . . . , Bn. A multicast is a transmission of a signal from the node A to more than one designated node, but not to all of the nodes, of the destinations B1, B2, . . . , Bn. A broadcast is a transmission of a signal from the node A to all of the nodes of the destinations B1, B2, . . . , Bn. In general, a loopback test is conducted as a unicast transmission. It is in principle possible to perform a loopback test to more than one destination node, as in a multicast transmission, but there are complications that arise in such a test that do not occur in a unicast test, such as identifying which return signal comes from which destination node, and taking into account possible delays in signal transmission caused by collisions between destination nodes attempting to respond to the test signal in competition with one another. To accomplish loopback tests with a plurality of destination nodes, one can perform successive tests with each node in a unicast procedure.

Modern digital communication systems are often packet-based systems. In such systems, the loopback test can be performed using one or more packets as the test signal. Not every packet sent from the source is required to cause a reflection, or loopback. A packet (or a frame) comprises a plurality of bits (or binary digits) that are arranged in a format specified by a protocol or other defining standard. Digital communication systems use frames or packets of data, comprising a header, a data payload, and a trailer, which will be described in more detail hereinbelow with regard to FIG. 3A. In packet-based systems, such as Ethernet based communication systems, communication systems conforming to the protocols used in Internet communications, and other modern digital communication systems, the operation and status of the communication system is in principle amenable to testing at one or more levels.

As is known in the digital communication arts, a communication system can be described or modeled as comprising a plurality of layers or levels. Examples of layered communication system models are the Department of Defense Four-Layer Model and the OSI Seven Layer Model. Depending on the model, a communication system may have one or more levels or layers that involve source and destination addresses. The loopback test systems and methods of embodiments of the invention provide solutions for performing loopback tests using addresses encoded at different layers. The loopback test systems and methods of embodiments of the invention provide convenient, software controlled interfaces and procedures that allow a user to set up or organize a loopback test, to monitor its operation, and to retrieve information from the message or messages that flow through the system in the process of performing the loopback test.

In order to explain various aspects of the invention, it is useful to present a short introduction to exemplary digital information communication systems and methods that rely on a layered structure or model. A common structure that is well known in the art is the OSI seven layer model. The OSI seven layer model is described in document OSI 7498, published by the International Standards Organization (hereinafter "ISO"). Each of the seven layers describes a functionality or a protocol. Protocols are defined whereby equipment and systems provided by different vendors can interact with each other according to commonly agreed procedures. By using so-called "protocol layering" it is possible to simplify networking designs. Each layer provides a functionality or capability to the layer above it, and each layer calls on the capability provided by the layer immediately below it to accomplish a useful task.

Information that is relevant to the present invention is published by the Internet Engineering Task Force (IETF) of the Internet Society in the form of a document referred to as a Request for Comment (RFC). Among the RFCs that are particularly relevant are RFC 791 (which describes the Internet Protocol), RFC 793 (which describes the Transmission Control Protocol) and RFC 2544 (which describes systems and methods for testing and reporting the performance of network interconnect devices). A copy of RFC 2544 is appended hereto. Appendix C of RFC 2544 describes in detail the formats to be used in testing TCP/IP over Ethernet.

FIG. 1 illustrates schematically a prior art seven layer model (the OSI Basic Reference Model) that is conventionally used for describing the functions and interrelationships of some digital communication systems. The operation of a communication system can be explained in general term using the model before describing the layers of the model in further detail. For example, if a user of a computer wants to visit the United States Patent and Trademark Office (hereinafter "USPTO") web site, and places the command "http://www.uspto.gov/" in the address line of his or her browser (an application layer program), the home page of the requested web site appears in the browser. The process by which this occurrence takes place involves interpretation of the high level command given above in quotes, generation of one or more digital packets, transmission by hardware (such as a modem) of those one or more packets to the web server of the USPTO web site, and receipt and interpretation of the transmitted packets at the targeted web site server. In response to the request for the contents of the desired web page, the USPTO server transmits back one or more packets of data, which are received by the person's computer and manipulated so as to display the requested page. The steps performed from receiving and interpreting the command "http://www.uspto.gov/" through the physical transmission of packets of data at the user's computer are carried out by a successive sequence beginning with general steps at level 7 through more and more detailed and atomistic steps down to level 1. Upon receipt of packets of data at a level 1 device (such as the modem of the user's computer) from the web server, the user's computer manipulates the packets according to the protocols of levels 1 through 7, finally displaying the desired information using a level 7 application such as the browser. The more explicit explanation of the properties and actions of the various layers follows.

The lowest layer is the Physical layer, or level 1. The Physical layer describes the physical properties of the various communications media, such as modems, as well as the electrical properties and interpretation of the exchanged signals, for example, the size of Ethernet coaxial cable, pinouts, electrical characteristics, and modulation and encoding of data bits on carrier signals. This layer ensures bit synchronization and places the binary pattern that it receives into a receive buffer. Once it decodes the bit stream, the physical layer notifies the data link layer (layer 2) that a frame has been received and passes it up. Examples of specifications include V.24, V.35, EIA/TIA-232, EIA/TIA-449, FDDI, 802.3, 802.5, Ethernet, RJ45, NRZ, and NRZI. Some protocols span a number of layers (e.g. NFS, 802.3 etc.). A benefit of the seven layer model is that software can be written in a modular way to deal specifically with one or two layers only. This is often called modular engineering.

Above the Physical layer is the Data Link layer, or level 2. The Data Link layer describes the logical organization of data bits transmitted on a particular medium, for example, for Ethernet, the second layer describes such properties as framing, addressing and the structure of check sums of the packets. Other examples include IEEE 802.2, IEEE 802.3, 802.5-Token Ring, HDLC, Frame Relay, FDDI, ATM, T1, E1, SONET, ISDN, DSL, DOCSIS, and PPP. This layer deals with getting data across a specific medium and individual links by providing one or more data link connections between two network entities. End points are specifically identified, if required by the Network layer Sequencing. The frames are maintained in the correct sequence and there are facilities for flow control and Quality of Service (QoS) parameters such as Throughput, Service Availability and Transit Delay. As will be seen, addresses are defined for level 2 data structures in packet-based digital communication systems and methods. The Data Link layer was split into two sublayers by the 802.11 Committee of the IEEE, which sublayers are the Media Access Control (MAC) sub-layer and the 802.2 Logical Link Control (LLC) sub-layer.

The Data link layer performs error checking using the Frame Check Sequence (FCS) in a trailer and discards the frame if an error is detected. It then looks at the addresses to see if it needs to process the rest of the frame itself or whether to pass it on to another host. The data between the header and the trailer is passed to layer 3. The MAC layer concerns itself with the access control method and determines how use of the physical transmission is controlled. The LLC shields the higher level layers from concerns with the specific LAN implementation.

The third level, also referred to as the Network layer, describes how data links can deliver data between any two nodes in a network by exchanging information in packet format, for example, by describing the addressing and routing structure of the Internet. The third level also handles the ordering and reassembly of packets that may have been broken up to travel across certain physical media. Some protocols in this layer also perform error recovery. The Internet Protocol (IP) is an example of a level 3 protocol, as are IPX and AppleTalk DDP. As will be seen, addresses are defined for level 3 data structures in packet-based digital communication systems and methods, and such addresses are in general different from the level 2 addresses mentioned in the previous paragraph.

The fourth level, also called the Transport layer, defines the quality and nature of the data delivery, including such features as whether and how retransmissions will be used to ensure data delivery, and the ordering and reassembly of packets that may have been broken up to travel across certain media. Some protocols in this layer also perform error recovery. The Transmission Control Protocol (TCP) of the Internet is an example of a fourth level protocol, as are UPD and SPX.

A fifth level, commonly called the Session layer, describes the organization of data sequences larger than the packets handled by lower layers, for example, how request and reply packets are paired in a remote procedure call, and how data conversations are started, controlled and finished. Examples of Session layer protocols include RPC, SQL, NetBIOS names, AppleTalk ASP, and DECnet SCP.

A sixth level, also known as the Presentation layer, provides the syntax of data being transferred. For example, the sixth level explains how floating point numbers can be exchanged between hosts with different math formats. Examples of layer 6 formats and protocols include MIDI, HTML, GIF, TIFF, JPEG, ASCII, and EBCDIC.

The Application layer, or the level seven layer, describes the operation of systems at a level where users interact with the systems and methods, to accomplish tasks that people wish to performs, for example, the implementation of file system operations, such as retrieving information from a desired location on a remote computer, e.g., browsing a web site, downloading or uploading files, or remotely operating an application program to perform a task. Examples of services within the application layer include HTTP, FTP, DNS, SNMP, SMTP gateways, a Web browser, a Network File System (NFS), Telnet and Remote Login (rlogin), X.400, FTAM, database software, and print server software.

An example of how protocol layering works can be observed and understood by considering the feature of encapsulation. In the encapsulation process, each successive layer encapsulates, or treats as data, the information packets generated by the layer above it. Each layer has its own header containing information relevant to its role. This header is passed down to the layer below which in turn adds its own header (encapsulates) until eventually the Physical layer adds the layer 2 information for passage to the next device which understands the layer 2 information and can then strip each of the layers' headers in turn to get at the data in the right location. Each layer within an end station communicates at the same layer within another end station.

Figure 2:
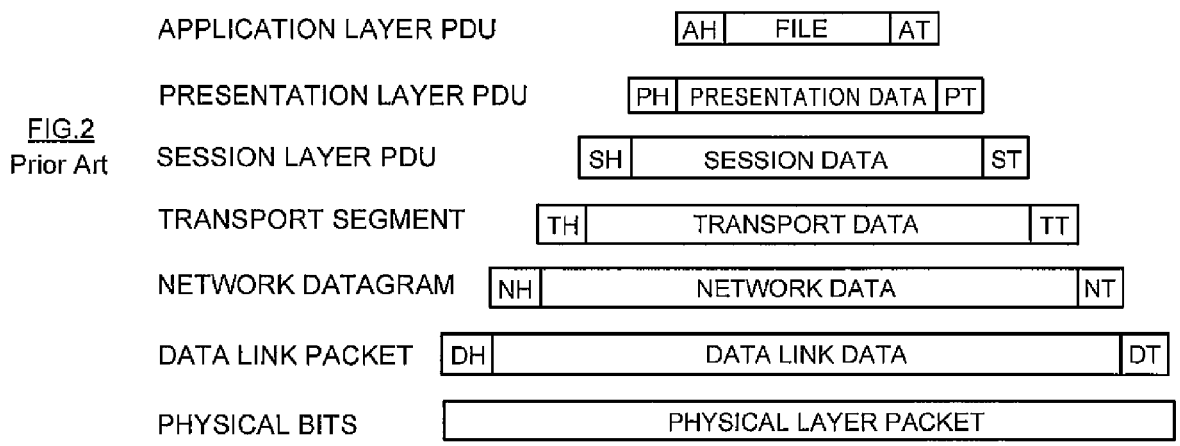
FIG. 2 illustrates in schematic form an example of encapsulation of a communication in a prior art digital communication system.

FIG. 2 illustrates in schematic form an example of encapsulation of a communication in a prior art digital communication system. The example involves the encapsulation of a command, such as a request to obtain a hypertext page from a web site over the internet from an Internet server, using a modem or other hardware for the actual communication of information between different apparatus. The top level of FIG. 2 schematically shows a Protocol Data Unit (PDU) or frame of data generated at the Application layer (or level 7). The frame has an application header (denoted AH), application data (here denoted "file"), and an application trailer (denoted AT). As the Application PDU is communicated to the next lower level, the Presentation layer, the PDU of the Application layer is encapsulated within the PDU generated by the Presentation layer, as schematically indicated by the Presentation Data portion of the Presentation PDU having an extent at least as long as the Application PDU in its entirety. The Presentation PDU also has a header (denoted PH) and a trailer (denoted PT) which delimit the presentation data portion. As an example, a command issued to construct a message requesting the page in HyperText Transfer Protocol (HTTP) format could be "http://www.uspto.gov," e.g., requesting a copy of the USPTO home page. The exact form of the message is not important for the present explanation. It is sufficient to recognize that the message is handled as described hereinbelow. HTTP is a level seven, or application layer, protocol. HTTP 1.0 is described in RFC 1945.

As the request for the web page moves from one layer to the next lower layer, each layer can encapsulate the previous level's message, comprising a header, data and a trailer. The layer performing the encapsulation treats the message it receives as data, and adds its own header and trailer. The encapsulating layer may rearrange, compress, expand, encrypt, or otherwise change the data, so long as a corresponding layer can recover the original information by applying an inverse operation to the resulting encapsulated message. The header and trailer of a higher level are treated as data by the lower levels. As seen schematically in FIG. 2, the physical layer packet (or multiple packets) that result are viewed as strings of bits that the hardware can transmit and can receive.

To further explain our example, FIG. 2 depicts the encapsulation of the HTTP message to get the web page within a message generated by the Transmission Control Protocol at the Transport layer. TCP provides the connection management and reliable delivery that HTTP requires, but that HTTP does not provide itself. TCP defines a message header format, which can be followed by arbitrary data. The encapsulated message comprises a TCP header attached to the HTTP message. As already indicated, TCP is a level 4 protocol.

Referring again to FIG. 2, the next step in the encapsulation process is performed by the level 3 IP protocol. The TCP protocol does not provide any facilities for actually relaying a message from one machine to another in order to reach its destination, but rather assures that a message that is sent is actual received, and if needed, that replacement copies of packets are sent until the message is completely transferred. The addressing feature is provided by the Internet Protocol (IP), which defines its own message header format. An IP message is constructed by attaching an IP header to the combined TCP/HTTP message, forming an encapsulated message having the form indicated schematically by FIG. 2 at the Network layer as a network datagram.

Although IP can direct messages between machines, it can not actually transmit the message from one machine to the next. The physical transmission function is dependent on the actual communications hardware. For example, we suppose that a dialup modem connection has been specified. Therefore, a first step in transmitting the message will involve the Point-to-Point Protocol (PPP), which is a common protocol used by dial-up modems. The encapsulated message will appear as shown schematically in FIG. 2 at the Physical layer, in which the PPP encapsulation encloses the entire message, and creates one or more packets, rather than simply attaching a header. This is because PPP may modify the message. The receiving modem operating according to PPP reverses these changes, and the message emerges intact. The encapsulating protocol can manipulate the format of the message in any necessary or useful way, including breaking the message into packets of manageable length, provided that the original message is extracted and restored upon receipt.

FIG. 3A is a schematic diagram of a generic frame or packet of bits. In FIG. 3A, a sequence of structures are presented, from left to right. A packet can comprise a preamble that provides information about the packet, and may include timing information indicating when the packet is to be considered to have started. The packet can comprise one or more addresses, including a destination address (e.g., to address of an intended recipient) and a source address (e.g., the address of the device that transmits the packet). The packet can comprise a control field that identifies the type of information that is being sent as data. The packet header comprises the preamble, one or more addresses, and control field. The packet further comprises data, and in some embodiments comprises padding. The data is the information that the packet is carrying. When the amount of information is represented by a small number of bits, padding may be added to cause the data length in bits to reach a minimum required value, or to reach a predefined length. In general, padding is provided as bits of zero value. The packet can further comprise a trailer, including a frame check sequence, such as error checking code (for example a cyclic redundancy check or CRC value) and may optionally comprise an end frame delimiter (such as a predefined sequence of bits indicating that he end of the packet or frame has been reached). For packets of defined length, an end frame delimiter may be superfluous, as the receiving hardware can count bits (or groups of 8 bits, e.g., bytes or octets) to determine the end of a packet. Packets can be more detailed than the simple generic packet indicated in FIG. 3.

Turning to FIG. 3B, there is shown in schematic form a packet suitable for use in a network that uses Media Access Control (MAC) addressing. FIG. 3B is a diagram that schematically illustrates the format of an Ethernet frame, according to the original IEEE 802.3 standard. FIG. 3B shows a packet comprising a preamble having a length of 7 bytes, a one byte start frame delimiter, a destination MAC address having a length of 6 bytes, a source MAC address having a length of 6 bytes, a Type/Length field having a length of 2 bytes, an options field having an undefined length (e.g., options field may not be present), a data field of sufficient length to reach the minimum packet size of 64 bytes (with padding as may be needed) and not to exceed the maximum packet size of 1518 bytes, and a FCS field of 4 bytes. The total count of bytes in the packet does not include the length of the preamble.

FIG. 3C is a schematic diagram that illustrates the format of an Ethernet frame comprising a VLAN tag, as described in the IEEE 802.3ac standard. The VLAN tag of the frame of FIG. 3C comprises a 2 byte field identified as Length/Type=802.1Q Tag Type (e.g., a tag defined in IEEE standard 802.1Q as having the value hexadecimal 8100 or 0x8100), and a 2-byte field identified as Tag Control Information. In a digital communication system employing VLANs, the maximum Ethernet frame length is 1522 bytes.

VLANs are employed in order to optimize the utilization of a high capacity transmission medium (e.g., cable or fiber). A Local Area Network (LAN) can be thought of as an interconnection of devices that can communicate without requiring a router. In a system employing VLANs, data is sent between devices that are part of a virtual network that has been defined on a physical LAN. A communication intended for members of a VLAN includes a VLAN tag as part of the header. A communication having a VLAN tag is read and acted upon by devices that are members of the VLAN, while other devices that are not members of the VLAN ignore the message, even though the devices may be physically connected to the transmission medium.

Figure 4:
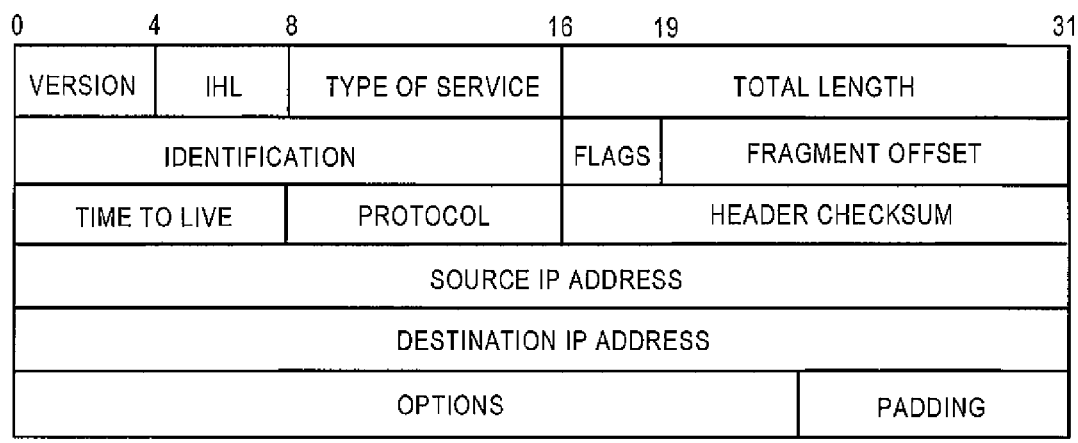
FIG. 4 is a diagram showing in schematic form the structure of an IP message header.

IP addresses are represented in a form convenient for humans to read as a quartet of numbers separated by periods in a string, such as 151.207.245.67 (e.g., the IP address of the server that responds to http://www.uspto.gov), where each decimal number falls within the range of 0 to 255 (e.g., within the range that can be represented by an 8-bit unsigned binary number). The same address can equally be represented by a sequence of four 8-bit bytes (e.g., 32 bits), separated by periods, such as 10010111.11001111.11110101.01000011, which is readily utilized by computers. FIG. 4 is a diagram showing in schematic form the structure of an IP message header according to Internet Protocol version 4 (IPv4). The fourth and fifth rows of FIG. 4 represent 32 bit representations that are used to encode an IP source address and an IP destination address, respectively. The other contents of the header are not important for the discussion of the present invention. The interested reader can find information about the IP header according to IPv4 in RFC 791. In addition, a later version of the Internet Protocol, referred to as Internet Protocol version 6 (IPv6) and discussed in RFC 2460, describes an IP header having IP source and destination addresses that comprise 16 bytes, or 128 bits. While a 128-bit address offers a considerable increase in the range of permitted addresses as compared to a 32-bit address, the use of 128-bit addressing as in IPv6 can represent a considerable burden on the testing system, and can reduce the number of communication channels amenable to test at a given time, all other factors being equal.

One way to perform a loopback test using a packet-based digital communication system is to generate at least one packet having a source address corresponding to a source location (or source piece of apparatus) and a destination address corresponding to a desired destination location (or destination piece of apparatus) in order to test the operation of the communication line between the two locations, as well as the operation of the apparatus at the destination location. The packet is then sent from the source apparatus to the destination apparatus. At the destination apparatus, the source address and the destination address are exchanged, generating a second packet. The second packet is then sent from the destination apparatus back to the source apparatus, with the original source address used as the destination address, and the original destination address used as the source address, representing a packet being sent in the direction opposite to the first packet. The first packet and the second packet may or may not traverse the same path in the network. The addresses used for the loopback test can be level 2 addresses, such as MAC addresses, or level 3 addresses, such as IP addresses, or both.

The encapsulation feature of a layered model of a communication protocol provides benefits, but also creates one or more potential problems with regard to loopback testing. One problem involves the use of a VLAN. When a VLAN is defined, the addressing procedure of level 2 is modified, as may be seen by comparing FIGS. 3B and 3C, by the inclusion of a VLAN tag. However, this change is not reflected in the level 3 addressing (for example IP addressing) that becomes encapsulated in the level 2 frame (for example an Ethernet frame). Accordingly, when the VLAN is defined, attempts to change the IP addresses in the test message could result in an undesired loop. Therefore, when a frame of data indicates that a VLAN is defined, the exchange of level 2 addresses to generate a second packet from the first packet is feasible. However, exchanging level 3 addresses optionally can be performed or optionally can be overridden. Therefore, the identification of a VLAN tag in a packet sent as part of a loopback test is used as a signal optionally to suppress the exchange of level 3 addresses. If a VLAN tag is not recognized as being present, exchange of level 3 addresses, if desired, is performed. A loopback test override module is provided to search for and to recognize the presence of a VLAN tag, and if found, optionally to suppress attempts to exchange level 3 addresses.

The loopback testing systems and methods of the invention can be implemented in one embodiment with a CMA 5000 Multi-Layer Network Test and Measurement Platform programmed with suitable software, both of which are available from NetTest North America, Inc., Center Green Bldg. 4, 6 Rhoads Drive, Utica, N.Y. 13502 USA. The CMA 5000 has the ability to perform tests and measurements involving the Physical, Data Link, Network and Transport layers. The CMA 5000 provides the ability to characterize critical network parameters and diagnose network impairments. In another embodiment, the loopback tester apparatus is a hand-held, device that provides all of the needed functionality. In some embodiments, the loopback tester apparatus is portable. In some embodiments, the loopback tester apparatus is battery powered. In some embodiments, the loopback tester apparatus displays results and accepts user input. A suitable device for providing such a display and input capability is in one embodiment a small visual display, such as the small touch screen used in many PDAs (e.g., the Palm Pilot or Palm Tungsten E touch screen display).

The CMA 5000 Gigabit Ethernet application measures critical parameters during network installation, including throughput, latency, burstability and frame loss, connectivity and errored frame rate (as detailed in RFC 2544) to ensure proper and efficient deployment of services. In one embodiment, the user can perform all relevant tests, including RFC 2544 by loading software that defines automated, preconfigured settings or the user can define any or all parameters individually. In one embodiment, called the Channel Statistics option, the user can obtain detailed statistics on all traffic received for up to 8,000 individual Ethernet or IP addresses, VLAN tags or MPLS labels.

In one embodiment, the suitably programmed CMA 5000 apparatus provides auto-negotiation and auto-detection capabilities that allow important network parameters such as connectivity, link activity utilization, valid frame transmission and errored frames to be viewed immediately and automatically. Measurement results can be displayed in both a detailed tabular (statistical) and intuitive graphical format. Thresholds may be set for all measurements to provide a quick, visual indication of pass/fail test status and the source of the failure.

In one embodiment, an application, referred to as the Reflector application, is used to create a loop-back of network traffic. It has two basic modes of operation. In a first mode the systems and methods of the invention reflect all unicast traffic. In this first mode, the application will unconditionally exchange (or "swap") the MAC addresses of an incoming packet or frame and re-transmit the frame. In a second mode, which is termed selective reflection, the user specifies a MAC address to the application. Only the incoming frames that include that MAC address as their destination MAC address will be reflected. Both modes support the option to exchange the IP addresses, if an IP header is present in the frame. However, the software includes a loopback test override module that is configured to recognize the presence of a Virtual Local Area Network (VLAN) tag in a frame. If the IP address swap option is enabled, and an incoming frame includes a VLAN tag, then the frame will not be reflected.

In another embodiment, the software includes an application, referred to as the RFC-2544 application, that includes a suite of tests designed to implement the RFC-2544 recommendations for Ethernet testing.

The inherent latency of a loop-back cable can be measured and entered into the latency calibration field. Once entered, it will be subtracted from all future latency measurements. The latency calibration field can be found under the Setup menu (front panel hard-key button) of each test mode that includes a latency measurement.

In one embodiment, referred to as a Layer 2 switch test, both the input and the output ports of the test apparatus are connected to the device under test (sometimes referred to as a "DUT"). The Source and Destination addresses are entered once for Port 1, since it is assumed they are reversed for Port 2. However, a unique gateway address and network mask may be specified for each port if required.

The user may select to run Throughput, Frame Loss, Throughput & Frame Loss, Latency and Burst tests. The user may specify frame size(s), frame rate(s), frame contents, number of repeats, and other parameters for each test. The selected tests are run simultaneously from both ports, i.e., each port functions as a transmitter and a receiver. The test results are presented on a per port display.

In one embodiment, referred to as a Layer 3 Router Test, only the latency is measured between the CMA 5000 and a device capable of responding to an ICMP echo request, typically a Layer 3 device such as a router.

The test can operate in a one- or two-port configuration. Proper (and independent) IP and MAC address information must be supplied for each port connected to the network. Address Resolution Protocol (ARP) is supported if the MAC address of the device under test is unknown, and a gateway may be specified for each port if required. Results are presented on a per port display.

In this configuration, very high ICMP frame rates might cause the device under test to suspect a denial of service attack and shut down. Therefore, the Throughput values for this test are specified in Kbps (not Mbps), and the resulting frame rates used are much slower than the Layer 2 Latency test.

In another embodiment, referred to as an End-To-End Network Test, two CMA 5000 Gigabit Ethernet test sets are used, with one or two ports connected to the network. When setting up each unit, the following conventions are followed. One test set is designated as the "A" unit and the other test set is designated as the "B" unit. A radio button is provided at the bottom of the End-to-End Network Test mode panel for this purpose. Whatever Station (or Source) and Destination address information is specified for the "A" unit is reversed (or mirrored) on the "B" unit. A unique gateway and network mask can be specified on each unit and each port as necessary. Within each of the tests (Throughput, Frame Loss, Throughput & Frame Loss, Burst), the Frame Size, Line Load, and Frame information is to be specified identically on each unit. Results are presented on a per port display.

In one embodiment, a loop-back test, also referred to as a Single Ended Network Test, is performed. This test mode requires some form of loop-back in the network which will cause the frames transmitted by the CMA 5000 Gigabit Ethernet test set to be returned to the test set. The test mode can be run with one or two ports connected to the network.

At least three embodiments or configurations are contemplated. In a first embodiment, a loop-back is caused by a piece of network equipment (NE) (e.g. spanning ports on a switch). Setup of this configuration generally requires expert knowledge of the network equipment.

In a second embodiment, a second CMA 5000 Gigabit Ethernet test set is provided and, runs the Reflector application described above. The advantage of this configuration is that no network knowledge is required. The CMA 5000 Reflector application will simply reflect the frames it receives. In some embodiments, no RFC measurements are made or reported on the Reflector unit.

In a third embodiment, a second CMA 5000 Gigabit Ethernet test set, running the Single Ended Network Test software, is configured as an RFC Reflector unit. The third embodiment is performed with the following setup. The test set is designated as the "Reflector" unit. A radio button is provided at the bottom of the Single Ended Network Test mode panel for this purpose. Whatever Station and Destination address information is specified for the "Transmitter" unit are reversed (or mirrored) on the "Reflector" unit. A unique gateway and network mask can be specified on each unit and each port as necessary. The same Frame Size, Line Load, and Frame information is specified on each unit so that the Throughput, Frame Loss, Throughput & Frame Loss, Latency, and Burst tests operate correctly. In the third embodiment, the "Transmitter" unit will display results from the selected Throughput, Frame Loss, Throughput and Frame Loss, Latency, and Burst tests. The "Reflector" unit will display results from the selected Throughput, Frame Loss, Throughput and Frame Loss, and Burst tests, but will not display Latency results.

As alluded to hereinabove, certain protocols, such as Spanning Tree, include network monitoring software that is configured to shut down ports that appear to be part of a loop, so as to conserve network service bandwidth. In addition, Cisco switches commonly utilize Cisco Discovery Protocol (CDP) for communication between Cisco devices. The frames sent by CDP are unique in that their Source and Destination address are identical. This means that even if the source and destination are swapped, the frame still looks the same and the ports will be disabled. The ability of the CMA 5000 reflector application only to reflect back traffic sent to a specifically selected destination address provides a mechanism to circumvent these protocols and to enable efficient testing. As a result of this specifically selected destination capability, the CMA 5000 reflector application will not reflect the Spanning Tree or CDP control packets and thus the loop will not be detected and the ports will not be disabled.

Figure 5:
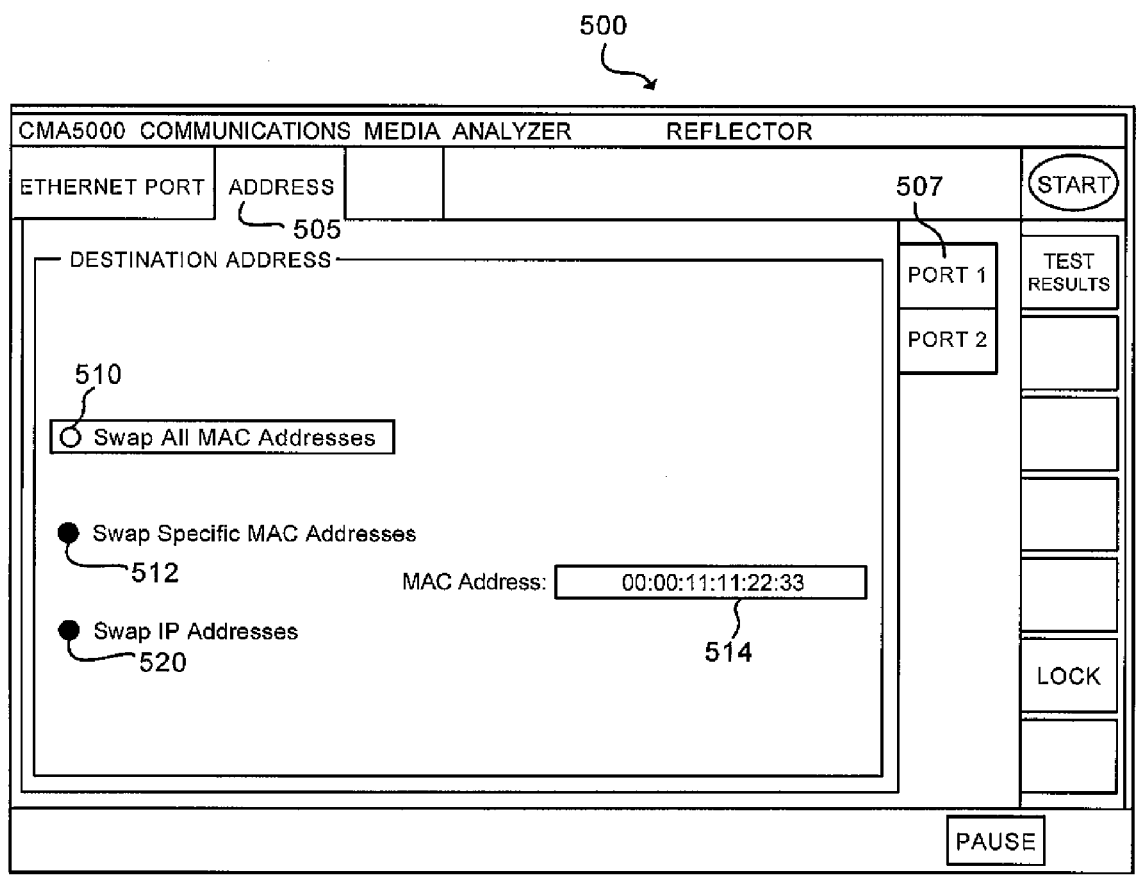
FIG. 5 is an image of a graphical user interface (GUI) used for configuring ports for a loopback test, according to principles of the invention.

The software is configured to set up and perform the loop-back test once an operator has correctly connected the test apparatus to the network to be tested. FIG. 5 is an image 500 of a graphical user interface (GUI) used for configuring ports for a loopback test. In FIG. 5, a tab 505 indicates that addresses are being specified. Another tab 507 indicates that the addresses are defined for Port 1, rather than Port 2. Radio button 510, which in FIG. 5 is not activated, selects all MAC addresses for swapping, or exchanging. Radio button 512, which is shown in FIG. 5 as activated, allows a user to select specific MAC addresses for swapping. Since Radio button 512 is selected, dialog window 514 is also active, in which the user indicates a selected MAC address, represented in the figure as the 6 hexadecimal bytes 00:00:11:11:22:33. Radio button 520, which is shown in FIG. 5 as being selected, activates the swapping of all IP addresses. It is possible that in some tests, only radio button 520 is selected, and neither radio button 510 nor radio button 512 is selected by the user. The user does not need to select the source addresses of the test equipment, and in fact may not be able to affect that selection other than by physically moving the test equipment to a new connection to the network.

Figure 6:
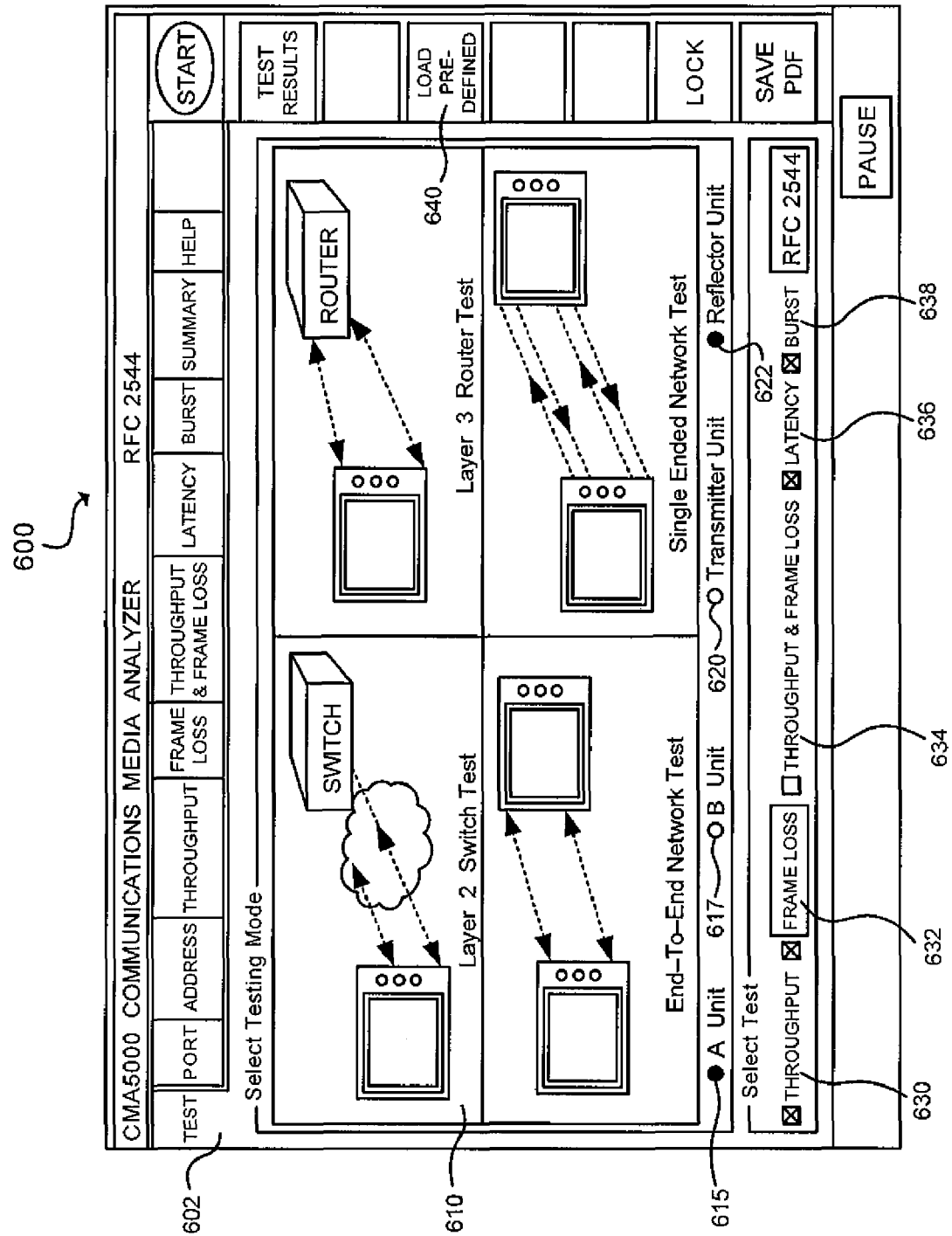
FIG. 6 is an image of a GUI for use by a user to set up a test according to an RFC 2544 application, according to principles of the invention.

FIG. 6 is an image 600 of a GUI for use by a user to set up a test according to an RFC 2544 application. Active tab 602 indicates that the user is setting up a test. Highlighted region 610 indicates that the user is configuring a Layer 2 switch test. Radio button 615, which is selected, indicates that the unit being configured is the "A" unit. If radio button 617 would have been selected, the unit would be the "B" unit. Radio button 620, if selected, would have indicated that the unit was the transmitter. However, selected radio button 622 indicates that the unit is configured as a reflector unit. Buttons 615 and 617 operate as mutually exclusive buttons, and buttons 620 and 622 operate as mutually exclusive buttons. The various check boxes 630, 632, 634, 636, and 638 at the bottom of the GUI indicate selection of tests to be conducted. Here, the selected tests are Throughput, Frame Loss, Latency, and Burst. A button 640 at the right of the GUI allows a user to load a predefined suite of test parameters.

Figure 7:
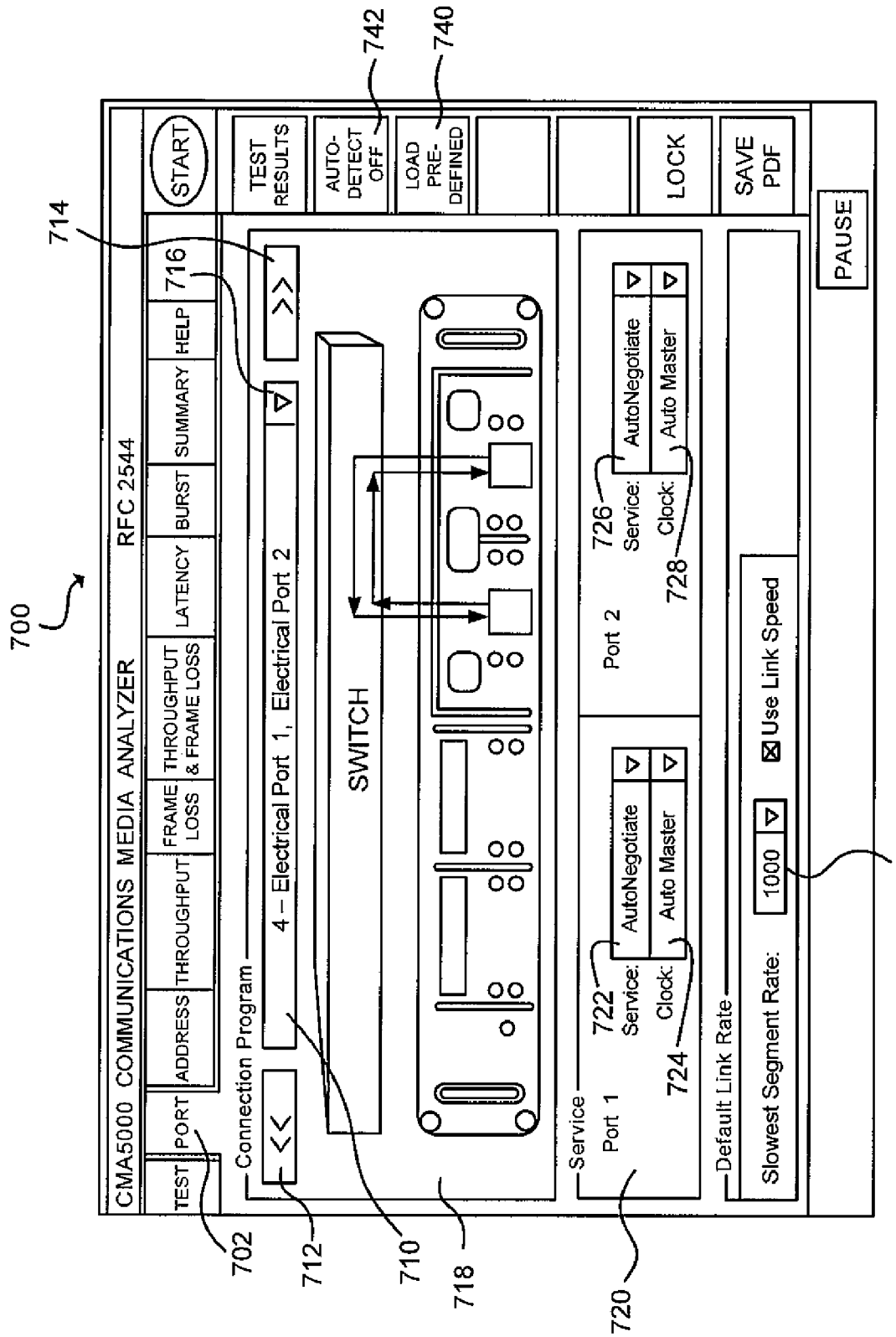
FIG. 7 is an image of a GUI for use by a user to set up certain port parameters of a test according to an RFC 2544 application, according to principles of the invention.

FIG. 7 is an image 700 of a GUI for use by a user to set up certain port parameters of a test according to an RFC 2544 application. Active tab 702 indicates that the user is setting up a port. Dialog Box 710 indicates which ports are being connected. As shown in FIG. 7, a configuration using electrical port 1 and electrical port 2 is selected. Arrow buttons 712 and 714 allow the user to jump to the first and last configurations, respectively. Pull-down button 716 allows the user to select a configuration from a menu of configurations. Display region 718 shows the user a diagrammatic image of the connections that have been selected. Optical ports can be selected in place of or in combination with electrical ports. Display area 720 indicates the services provided at each port. In FIG. 7, for port 1, dialog box 722, which can be controlled using the pull-down arrow at its right extremity, indicates that AutoNegotiate service has been selected, while dialog box 724, which can be controlled using the pull-down arrow at its right extremity, indicates that AutoMaster clock has been selected. In FIG. 7, for port 2, dialog box 726, which can be controlled using the pull-down arrow at its right extremity, indicates that AutoNegotiate service has been selected, while dialog box 728, which can be controlled using the pull-down arrow at its right extremity, indicates that AutoMaster clock has been selected. Dialog box 730 indicates that a default link rate of 1000 megabits per second as the slowest segment rate is selected. At the right hand side of the GUI 700, a button 740 is provided to permit the user to load a predefined configuration with the single push of a button. Button 742 is provided to permit the user to optionally toggle off the Autodetect feature.

FIG. 8 is an illustration of an exemplary loopback testing apparatus 800 in front elevation. The loopback tester 800 comprises one or more input and one or more output ports 1, such as Ethernet, USB, IrDA, PS/2, VGA, serial, and parallel ports and/or cad slots for devices such as PC cards (PCMCIA cards). For the purposes of performing loopback tests, an Ethernet port is the commonly used connection to the system under test. The loopback tester 800 comprises a touch screen 2 that provides both input and output functionality for the use of a user. The loopback tester 800 comprises one or more buttons 3 that provide dedicated one touch operation of functions such as commence a test, stop a test, file information in a data file, perform an instrument set-up procedure, print information to a printer, and provide online help. The loopback tester 800 comprises a cursor control 4 that allows a user to position a cursor on the display 2, and that further comprises a push button feature to allow the user to indicate to the tester apparatus that the current cursor location is a desired location. The loopback tester 800 comprises a drive 5 that comprises or accepts media for storing programs, files, and data, including any of a hard disk, a floppy disk, a CD-ROM with read and write capability, and/or a DVD drive with read and write capability. The loopback tester 800 comprises one or more LEDs 6 to indicate the state or activity of an external power connection, a battery, and a drive 5. The loopback tester 800 is a computer-based instrument, comprising a CPU and memory, such that the loopback tester can be configured to perform desired testing in accordance with suitable computer programs that can be executed by the CPU. Modules, such as the loopback test module and the loopback test override module, can be implemented as hardware or as software modules. The loopback test apparatus 800 comprises a transceiver that is configured to receive and to transmit digital information in the form of packets or frames.

FIGS. 8A-8C are illustrations of three embodiments of the loopback tester apparatus of FIG. 8 in side elevation. FIG. 8A is a unit having a housing 810 that can accommodate one or more sets of hardware modules for performing tests. FIG. 8B is a unit having a housing 810 that can accommodate one or more sets of hardware modules for performing tests, and an additional expansion unit 820 that can accommodate additional hardware modules. FIG. 8C is a unit having a housing 810 that can accommodate one or more sets of hardware modules for performing tests, and a plurality of additional expansion units 820 that can accommodate additional hardware modules.

Figure 9:
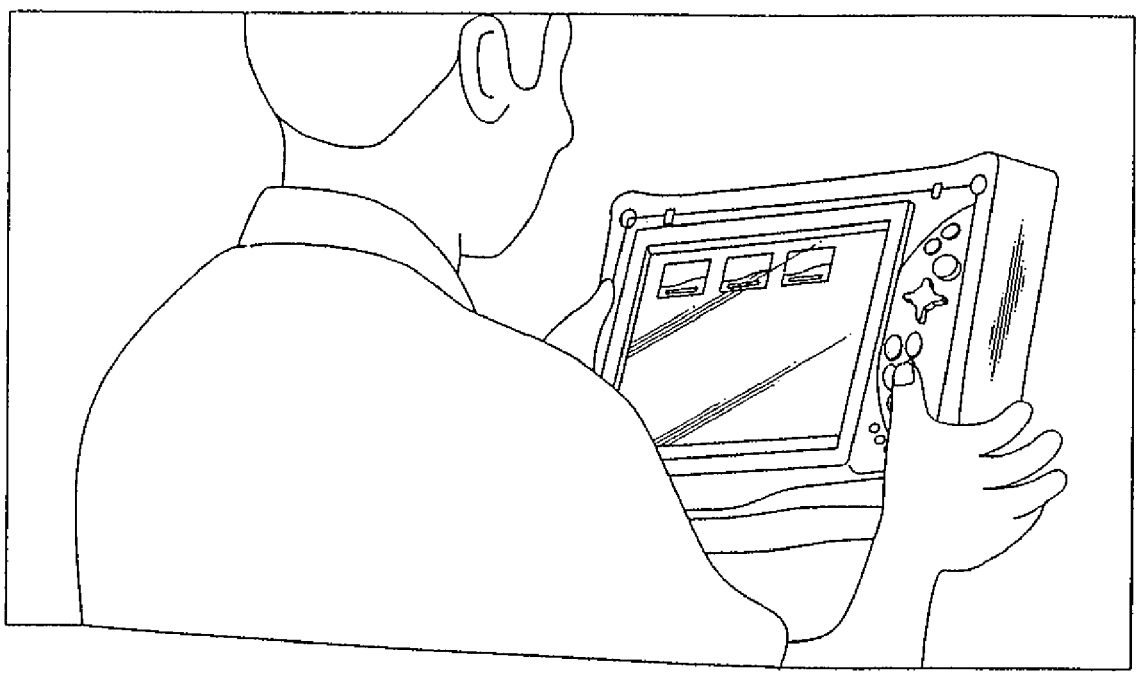
FIG. 9 is an illustrative example of the loopback tester of FIG. 8 as held in the hand of a user, according to principles of the invention.

FIG. 9 is an illustrative example of the loopback tester of FIG. 8 as held in the hand of a user. As shown in FIG. 9, the loopback tester is hand-held, portable device.

Figure 10:
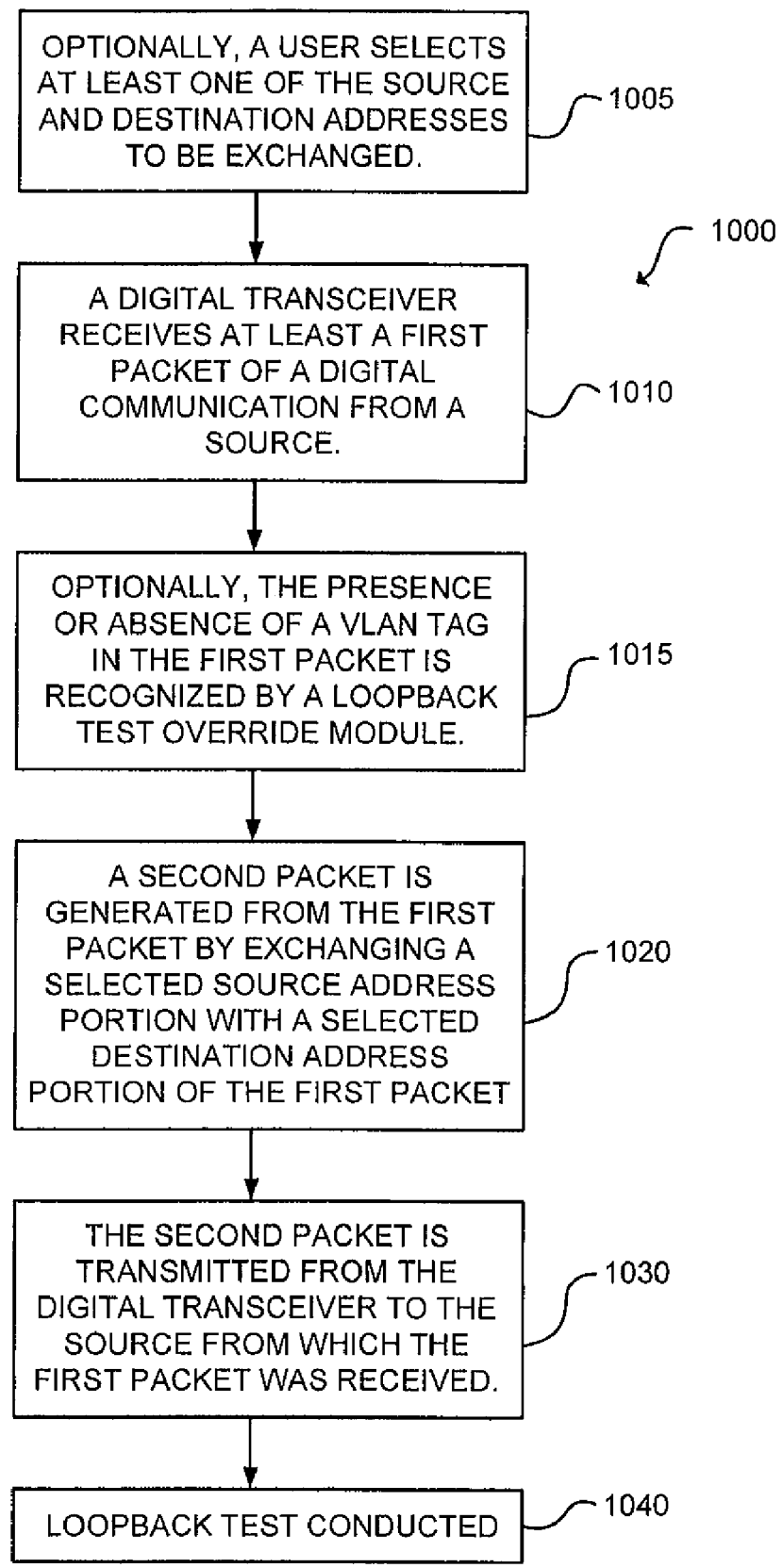
FIG. 10 is a flow diagram illustrating an exemplary general method of performing a loopback test, or equivalently, illustrating the relationships between and among modules that perform or control specific steps required to carry out a loopback test, according to principles of the invention.

FIG. 10 is a flow diagram 1000 illustrating an exemplary general method of performing a loopback test, or equivalently, illustrating the relationships between and among modules that perform or control specific steps required to carry out a loopback test. In FIG. 10, the method of performing a loopback test on a digital communication system comprises the following steps. As indicated at box 1010, a digital transceiver receives at least a first packet of a digital communication from a source. The packet has a structure including at least one source address portion and at least one destination address portion. As indicated at box 1020, a second packet is generated from the first packet by exchanging a selected one of the at least one source address portion of the first packet with a selected one of the at least one destination address portion of the first packet. As indicated at box 1030; the second packet is transmitted from the digital transceiver to the source from which the first packet was received. The loopback test is thereby conducted, as indicated by box 1040, and the operational parameters associated with the communication channel are evaluated. As explained hereinabove, the source and the destination address portions can be of level 2 addresses, such as MAC addresses, or they can be level 3 addresses, such as IP addresses. In addition, the method can optionally include a step 1015. At optional step 1015, the presence or absence of a Virtual Local Area Network (VLAN) tag in the first packet is recognized by a loopback test override module in communication with at least one of the digital transceiver and the loopback test module. Optionally, when the loopback test override module fails to recognize the presence of a VLAN tag in the first packet, the second packet is configured to be transmitted by the digital transceiver to the source from which the first packet was received, thereby to conduct a loopback test. In some embodiments, it is possible to exchange the source and destination addresses, even if a VLAN tag is recognized. In some embodiments, in an optional step 1005, a user can select at least one of the source and destination addresses to be exchanged.

Machine-readable storage media that can be used in the invention include electronic, magnetic and/or optical storage media, such as magnetic floppy disks and hard disks; a DVD drive, a CD drive that in some embodiments can employ DVD drive, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

The invention claimed is:

1. A network testing apparatus comprising:
 a central processing unit (CPU);
 a memory;
 a user interface;
 at least one communication port configured to receive network frames, each of said network frames including a frame payload and a layer 2 header, said layer 2 header comprising a layer 2 source address and a layer 2 destination address;
 wherein said network testing apparatus is configured to perform selective reflection of said networks frames received via said at least one communication port, by conditionally, upon said layer 2 destination address matching a user designated layer 2 address, swapping said layer 2 source address and said layer 2 destination address, and transmitting resulting network frames to said layer 2 source address.

2. The network testing apparatus of claim 1, wherein said at least one communication port is provided by at least one Ethernet interface.

3. The network testing apparatus of claim 1, wherein one or more of said network frames further includes a layer 3 header comprising a layer 3 source address and a layer 3 destination address; and wherein said network testing apparatus is further configured, responsive to a user interface action, to initiate an operating mode whereby said selective reflection of network frames further includes swapping said layer 3 source address and said layer 3 destination address of at least one of said one or more network frames.

4. The network testing apparatus of claim 1, wherein said layer 2 header of one or more network frames further comprises a VLAN tag; and wherein said network testing apparatus is further configured, responsive to a user interface action, to initiate an operating mode whereby said selective reflection of network frames is not performed for said one or more network frames comprising a VLAN tag.

5. The network testing apparatus of claim 1 further comprising a hand held housing and a battery.

6. The network testing apparatus of claim 1, wherein said at least one communication port comprises a first communication port configured to receive said network frames and a second communication port configured to transmit reflected network frames.

7. The network testing apparatus of claim 1, wherein said at least one communication port is provided by one communication port configured to receive said network frames and transmit reflected network frames.

8. The network testing apparatus of claim 1, wherein said layer 2 destination address is provided by one of: a unicast address, a multicast address.

9. A network testing apparatus comprising:
a central processing unit (CPU);
a memory;
a user interface;
at least one communication port;
wherein said network testing apparatus is configured to operate in a transmitter mode of operation and in a reflector mode of operation;
wherein said network testing apparatus is configured, when operating in said transmitter mode of operation, to transmit one or more network frames, each of said network frames including a frame payload and a layer 2 header, said layer 2 header comprising a layer 2 source address and a user designated layer 2 destination address; and
wherein said network testing apparatus is further configured, when operating in said reflector mode of operation, to perform selective reflection of said networks frames received by said at least one communication port, by conditionally, upon said layer 2 destination address matching a user designated layer 2 address, swapping said layer 2 source address and said layer 2 destination address, and transmitting resulting network frames to said layer 2 source address.

10. The network testing apparatus of claim 9, wherein said at least one communication port is provided by at least one Ethernet interface.

11. The network testing apparatus of claim 9, further configured, when operating in said transmitter mode of operation, to selectively perform said reflection of said networks frames received by said at least one communication port only for network frames including a layer 2 destination address matching a user designated layer 2 destination address.

12. The network testing apparatus of claim 9, wherein one or more of said network frames further includes a layer 3 header comprising a layer 3 source address and a layer 3 destination address; and wherein said network testing apparatus is further configured, when operating in said transmitter mode of operation, to initiate, responsive to a user interface action, an operating mode whereby said selective reflection of network frames further includes swapping said layer 3 source address and said layer 3 destination address of at least one of said one or more network frames.

13. The network testing apparatus of claim 9, wherein said layer 2 header of one or more network frames further comprises a VLAN tag; and wherein said network testing apparatus is further configured, when operating in said transmitter mode of operation, to initiate, responsive to a user interface action, an operating mode whereby said selective reflection of network frames is not performed for said one or more network frames comprising a VLAN tag.

14. The network testing apparatus of claim 9, further comprising a hand held housing and a battery.

15. The network testing apparatus of claim 9, wherein said at least one communication port comprises a first communication port configured to receive said network frames and a second communication port configured to transmit reflected network frames.

16. The network testing apparatus of claim 9, wherein said at least one communication port is provided by one communication port configured to receive said network frames and transmit reflected network frames.

17. The network testing apparatus of claim 9, wherein said layer 2 destination address is provided by one of: a unicast address, a multicast address.

18. A network testing system comprising:
a transmitter unit including a first central processing unit (CPU), a first memory, a first user interface, and at least one first communication port; and
a reflector unit including a second central processing unit (CPU), a second memory, a second user interface, and at least one second communication port;
wherein said transmitter unit is configured to transmit one or more network frames, each of said network frames including a frame payload and a layer 2 header, said layer 2 header comprising a layer 2 source address and a layer 2 destination address;
wherein said reflector unit is configured to perform reflection of said networks frames received by said at least one second communication port, by swapping said layer 2 source address and said layer 2 destination address, and transmitting resulting network frames;
wherein one of: said transmitter unit, said reflector unit is configured to accept user input designating said layer 2 source address and said layer 2 destination address, and to transmit said user designated layer 2 source address and said layer 2 destination address to one of: said reflector unit, said transmitter unit.

19. The network testing system of claim 18, wherein said transmitter unit is configured to accept user input designating at least one of: a first gateway address and a first netmask to be utilized by said transmitter unit;

wherein said reflector unit is configured to accept user input designating at least one of: a second gateway address and a second netmask to be utilized by said reflector unit.

20. The network testing system of claim 18, wherein said at least one first communication port is provided by at least one first Ethernet interface; and wherein said at least one second communication port is provided by at least one second Ethernet interface.

21. The network testing system of claim 18, wherein said reflector unit is further configured to selectively perform said reflection of said networks frames received by said at least one second communication port only for network frames including a layer 2 destination address matching a user designated layer 2 destination address.

22. The network testing system of claim 18, wherein one or more of said network frames further includes a layer 3 header comprising a layer 3 source address and a layer 3 destination address; and wherein said reflector unit is further configured, responsive to a user interface action, to initiate an operating mode whereby said reflection of network frames further includes swapping said layer 3 source address and said layer 3 destination address of at least one of said one or more network frames.

23. The network testing system of claim 18, wherein said layer 2 header of one or more network frames further comprises a VLAN tag; and wherein said reflector unit is further configured, responsive to a user interface action, to initiate an operating mode whereby said selective reflection is not performed for said one or more network frames comprising a VLAN tag.

24. The network testing system of claim 18, wherein said layer 2 destination address is provided by one of: a unicast address, a multicast address.

25. A method of performing loop-back testing in a communication network, said method comprising the steps of:

providing a network testing apparatus, said network testing apparatus including a central processing unit (CPU), a memory, a user interface, and at least one communication port, said communication port associated with a communication port layer 2 address and configured to receive network frames, each of said network frames including a frame payload and a layer 2 header, said layer 2 header comprising a layer 2 source address and a layer 2 destination address;

transmitting one or more network frames addressed to said communication port layer 2 address;

selectively reflecting, by said network testing apparatus, of said one or more received networks frames, by conditionally, upon said layer 2 destination address matching a user designated layer 2 address, swapping said layer 2 source address and said layer 2 destination address, and transmitting resulting network frames to said layer 2 source address.

26. The method of claim 25, wherein said step of transmitting is performed in a manner that said received frames and said transmitted frames do not traverse the same network path.

27. The method of claim 25, wherein one or more of said network frames further includes a layer 3 header comprising a layer 3 source address and a layer 3 destination address; and wherein said step of selectively reflecting further includes swapping said layer 3 source address and said layer 3 destination address of at least one of said one or more network frames.

28. The method of claim 25, wherein said layer 2 header of one or more network frames further comprises a VLAN tag; and wherein said step of selectively reflecting is not performed for said one or more network frames comprising a VLAN tag.

29. The method of claim 25, wherein said at least one communication port is provided by at least one Ethernet interface.

30. The method of claim 25, wherein said at least one communication port comprises a first communication port configured to receive said network frames and a second communication port configured to transmit reflected network frames.

31. The method of claim 25, wherein said at least one communication port is provided by one communication port configured to receive said network frames and transmit reflected network frames.

32. The method of claim 25, wherein said layer 2 destination address is provided by one of: a unicast address, a multicast address.

* * * * *

UNITED STATES PATENT AND TRADEMARK OFFICE
CERTIFICATE OF CORRECTION

| | | |
|---|---|---|
| PATENT NO. | : 7,864,691 B2 | |
| APPLICATION NO. | : 12/139916 | |
| DATED | : January 4, 2011 | |
| INVENTOR(S) | : Aaron T. Deragon et al. | |

It is certified that error appears in the above-identified patent and that said Letters Patent is hereby corrected as shown below:

In Claim 1 (Column 16, Line 64). Please delete "of said networks frames" and replace with
-- of said network frames --

In Claim 3 (Column 17, Line 13-14). Please delete "reflection of network frames" and replace with
-- reflection of said network frames --

In Claim 3 (Column 17, Line 16). Please delete "more network frames" and replace with
-- more of said network frames --

In Claim 4 (Column 17, Line 22-23). Please delete "reflection of network frames" and replace with
-- reflection of said network frames --

In Claim 9 (Column 17, Line 56). Please delete "said networks frames" and replace with
-- said network frames --

In Claim 11 (Column 18, Line 1). Please delete "of said networks" and replace with
-- of said network --

In Claim 12 (Column 18, Line 12-13). Please delete "of network frames" and replace with
-- of said network frames --

In Claim 12 (Column 18, Line 15). Please delete "or more network frames" and replace with
-- or more of said network frames --

In Claim 13 (Column 18, Line 23-24). Please delete "reflection of network frames" and replace with
-- reflection of said network frames --

In Claim 18 (Column 18, Line 54). Please delete "said networks frames" and replace with
-- said network frames --

Signed and Sealed this
Twenty-second Day of March, 2011

David J. Kappos
*Director of the United States Patent and Trademark Office*

CERTIFICATE OF CORRECTION (continued)
U.S. Pat. No. 7,864,691 B2

In Claim 22 (Column 19, Line 23). Please delete "of network frames further" and replace with
-- of said network frames further --

In Claim 22 (Column 19, Line 26). Please delete "more network frames" and replace with
-- more of said network frames --

In Claim 23 (Column 19, Line 32). Please delete "said selective reflection" and replace with
-- said reflection --

In Claim 25 (Column 19, Line 43). Please delete "said communication port associated" and replace with -- said at least one communication port associated --

In Claim 25 (Column 20, Line 7). Please delete "said one or more received networks frames," and replace with -- one or more received network frames, --

In Claim 26 (Column 20, Line 14-15). Please delete "that said received frames and said transmitted frames" and replace with -- that received frames and transmitted frames --

In Claim 27 (Column 20, Line 22-23). Please delete "one or more network frames" and replace with
-- one or more of said network frames --